US010602235B2

(12) United States Patent
Smith et al.

(10) Patent No.: US 10,602,235 B2
(45) Date of Patent: Mar. 24, 2020

(54) VIDEO SEGMENT DETECTION AND REPLACEMENT (71) Applicant: ARRIS Enterprises LLC, Suwanee, GA (US)

(72) Inventors: Alfonso Martinez Smith, Algonquin (IL); Anthony J. Braskich, Kildeer, IL (US); Faisal Ishtiaq, Plainfield, IL (US); Benedito J. Fonseca, Jr., Glen Ellyn, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,577

(22) Filed: Dec. 29, 2016

(65) Prior Publication Data
US 2018/0192158 A1 Jul. 5, 2018

(51) Int. Cl.
*H04N 21/234* (2011.01)
*H04N 21/81* (2011.01)
*H04N 21/845* (2011.01)
*H04N 21/2387* (2011.01)
*H04N 21/432* (2011.01)
(Continued)

(52) U.S. Cl.
CPC ....... *H04N 21/812* (2013.01); *H04N 21/2387* (2013.01); *H04N 21/23418* (2013.01); *H04N 21/23424* (2013.01); *H04N 21/251* (2013.01); *H04N 21/4325* (2013.01); *H04N 21/44222* (2013.01); *H04N 21/8455* (2013.01); *H04N 21/8456* (2013.01)

(58) Field of Classification Search
CPC .......... H04N 21/812; H04N 21/23418; H04N 21/2387; H04N 21/8456
See application file for complete search history.

(56) References Cited

U.S. PATENT DOCUMENTS

| 7,707,485 B2 | 4/2010 | Laksono |
| 7,962,330 B2 | 6/2011 | Goronzy et al. |
| 8,654,255 B2 | 2/2014 | Hua et al. |

(Continued)

OTHER PUBLICATIONS

PCT International Search Report & Written Opinion, RE: Application No. PCT/US2017/065920, dated Mar. 20, 2018.

*Primary Examiner* — Olugbenga O Idowu
(74) *Attorney, Agent, or Firm* — Stewart M. Wiener (57) ABSTRACT A method of video segment detection within a transport stream of a video asset is provided. Boundaries of candidate video segments of interest (i.e., advertisements, sports highlights, news highlights, content summaries, etc.) within a video asset are detected with a media analysis detector and are separately detected based on statistical models generated from historic transport control event data collected from a population of viewers of the video asset. The above referenced information concerning the candidate video segments of interest is used to identify beginning and end boundaries of selected candidate video segments within the transport stream. A transcoder is provided with parameters corresponding to the selected candidate video segments and performs group of pictures (GOP) and chunk boundary alignment of chunks of the transport stream with the boundaries of the selected candidate video segments. A system and non-transitory computer-readable storage medium are also disclosed.

20 Claims, 5 Drawing Sheets (51) Int. Cl.
*H04N 21/25* (2011.01)
*H04N 21/442* (2011.01)

(56) References Cited

U.S. PATENT DOCUMENTS

| | | | |
|---|---|---|---|
| 8,948,249 | B2 | 2/2015 | Sun et al. |
| 2008/0127244 | A1* | 5/2008 | Zhang .................... H04N 5/147 |
| | | | 725/32 |
| 2012/0137015 | A1 | 5/2012 | Sun |
| 2014/0013349 | A1* | 1/2014 | Millar .............. H04N 21/23439 |
| | | | 725/32 |
| 2014/0033036 | A1 | 1/2014 | Gaur et al. |
| 2015/0363648 | A1 | 12/2015 | Li et al. |
| 2016/0353139 | A1* | 12/2016 | Smith ............. H04N 21/23424 |

* cited by examiner

VIDEO SEGMENT DETECTION AND REPLACEMENT

BACKGROUND

Network digital video recorders (nDVR), network personal video recorders (nPVR), remote storage digital video recorder (rs-DVR), and like equipment are network-based digital video recorders that may be stored or located on the cloud at a server location or at a content provider's location rather than at a consumer's private location or home. Such network devices have effectively increased the consumer's ability to time shift the consumption of programs (i.e., to record, download, or stream a program and ultimately consume the program or parts thereof at a later time that best suits the consumer). This ability to time shift also provides the consumer with enhanced power to consume only selected portions of programs by, for example, skipping or fast-forwarding through portions of recorded content, and also to consume parts of a program multiple times via use of rewinding or the like.

In an nDVR or time-shifted content delivery system, video content available for playback may be recorded, transcoded, and stored in several video formats. Typically, each format consists of a different video resolution and bitrate, to enable adaptive bitrate streaming. The multiplicity of different stream formats and bit rates enables the content to be sourced to devices with different capabilities, such as high definition televisions of wide ranging sizes, personal computers, tablet computers, smart phones, and other client devices. In addition, the different bit rates support adaptive streaming, whereby the receiving client has the ability to measure network congestion and request a lower or higher bit rate stream from the source which may eliminate visual impairments caused by network congestion (e.g. macro-blocking due to dropped packets, frozen frames) at the expense of higher resolution video.

Automatic segment detection and replacement procedures often result in imprecise insertion in such video delivery environments. The imprecision consists of a misalignment of an inserted video clip with the group of pictures (GOP) or chunk boundary. In the case where the segments are ad avails (i.e., advertising availabilities), solutions exist to align a video clip to a chunk boundary of a video asset if there are SCTE-35 markers present. SCTE-35 refers to a standard of the Society of Cable and Telecommunications Engineers that describes inline insertion of cue tones in MPEG-TS streams. However, not all advertisements carry SCTE-35 markers. Furthermore, non-broadcast solutions, such as provided by on-demand or over-the-top video content delivery types, frequently utilized by Multiple System Operators (MSOs) may not carry SCTE-35 markers and may thereby affect the precision of advertisement insertion. Still further, SCTE-35 markers will not be available in the case where segments being replaced are not ad avails, for instance, in the automatic creation of sports highlights, news reels, user-requested content summaries, or the like.

SUMMARY

According to an embodiment, a method of video segment detection and replacement within a transport stream of a video asset deliverable to client devices in a sequence of chunks is provided. Candidate video segment boundaries are detected within a video asset with at least one media analysis detector and separately detected based on statistical models generated from historic transport control event data collected from a population of actual viewers of the video asset. The above referenced information is combined to precisely identify the beginning and end boundaries of candidate video segments to be replaced within the transport stream. A transcoder is provided with parameters corresponding to the candidate video segments to be replaced and performs group of pictures (GOP) and chunk boundary alignment of chunks of the transport stream with the boundaries of the candidate video segments to be replaced.

According to another embodiment, a system of video segment detection and replacement within a transport stream of a video asset is provided. The system includes at least one media analysis detector for detecting candidate video segment boundaries within the video asset with at least one media analysis detector. The system also includes a transport control analyzer for detecting candidate video segment boundaries based on statistical models generated from historic transport control event data collected from a population of viewers of the video asset. The system further includes a segment replacement selector for combining information of the candidate video segment boundaries detected by the at least one media analysis detector with information of the candidate video segment boundaries from the statistical models generated from the historic transport control event data and for identifying beginning and end boundaries of candidate video segments to be replaced within the transport stream from such information. The system further includes a transport stream rebuilder for performing group of pictures (GOP) and chunk boundary alignment of chunks of the transport stream with the boundaries of the candidate video segments to be replaced.

According to a further embodiment, a non-transitory computer-readable storage medium comprising stored instructions which, when executed by one or more computer processors, cause the one or more computer processors to perform the steps of the above referenced method.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, automatic segment detection and replacement procedures often result in imprecise insertion in video delivery environments such that misalignment of an inserted video clip occurs with a group of pictures (GOP) or chunk boundary, particularly when SCTE-35 markers are not provided or when segments being replaced are not ad avails.

Accordingly, embodiments are provided that detect and/or replace video segments in a chunked transport stream of a video asset. In these embodiments, information about the content is used to influence detection of segments in a chunked transport stream. The information may include historic viewing behavior data and content media analysis data.

With respect to viewing behavior data, such data may be obtained through collection of user interactions while watching content, such as fast forward, rewind, pause, play, stop, skip ahead, skip back/replay, slow motion, and other similar commands that affect the playback of the video. Often, these interactions occur via a remote control while watching the content on a primary (TV) screen, but could also occur on a secondary (phone/tablet) device, in a web browser on a computer, or any other manner in which video can be delivered. Interactions for a relatively large population of viewers can be collected over time and analyzed. When such historic information is viewed in aggregate across a large population of viewers, it may indicate portions of content which may have been of lower interest (many fast forward or skip ahead events) or of higher interest (many rewinds or replay events) during past viewings of the content.

With respect to content media analysis data, such data may be obtained through automated analysis of video, audio and text components of a video asset. This analysis can determine several features of the video asset, including scene changes, identification of advertisements, level of activity or motion, relative importance or relevance of segments, and similar information.

Accordingly, a system and method for locating video segments that are not otherwise identified with SCTE-35 markers in a video asset is provided that utilizes a combination of media analysis techniques (e.g., black frames, quick silence, hard cuts, and the like) and statistical likelihood estimates (i.e., created and updated by analytics-based crowd-sourcing) to thereby influence transcoder and chunker operational parameters to obtain GOP boundary and chunk boundary alignment in a resulting transport stream at the point of an insertion.

According to an embodiment, media analysis detectors may be used to identify boundaries corresponding to certain events associated with content-level occurrences in a video asset. Examples include black frame and quick silence detectors which can be used separately or in conjunction to provide a rough estimate of advertisement boundaries in a video program. Likewise, logo and marker frame detectors can be used, for instance, to signal the beginning and/or end of sports replay segments or the like within a video asset. Other media analysis detectors may also be used that assist in boundary identification of content-based events in video assets. Thus, the output of the media analysis detector may be converted into semantically-meaningful events within analyzed media of the video asset.

Transport control event detectors may also be used to locate areas of particular interest in video assets that are determined from information gained from crowd-sourced interactions between end users and video content. For instance, according to an embodiment, identification of ad boundaries and segments of viewer interest may be based on analysis and modeling of trick-play usage patterns (i.e., fast forward, rewind, etc.).

According to a further embodiment, the combination of media analysis and transport control events may be utilized to aid in the determination of the exact timing of segment removal and insertion within a video asset with great precision. Media analysis detectors are able to provide a general "area of interest" in video timing. The further use of transport control events enables finer granularity within such an area of interest due to the millisecond-level timing of transport control events. Thus, according to an embodiment, the combined output of media analysis detectors and information of transport control events may be used to identify video coding boundaries with greater precision within a video asset and to achieve a desired goal of boundary-level alignment.

Thus, in accordance to an embodiment, video segment boundaries are detected using one or more media analysis detectors and candidate video segment boundaries are detected based on statistical models generated from transport control event data across a significant population of users. Information of the candidate segments from media analysis detectors may be combined with information of the candidate segments from transport control event statistics to select the best candidate segments (i.e., candidate segments of interest to be replaced) based on an output of such a combination. Thereafter, a transcoder may be informed with appropriate parameters to perform GOP and chunk boundary alignment and the video asset may be reassembled in a manner in which the chunks of existing ad avails are aligned with the chunks of ads to be replaced.

Figure 1:
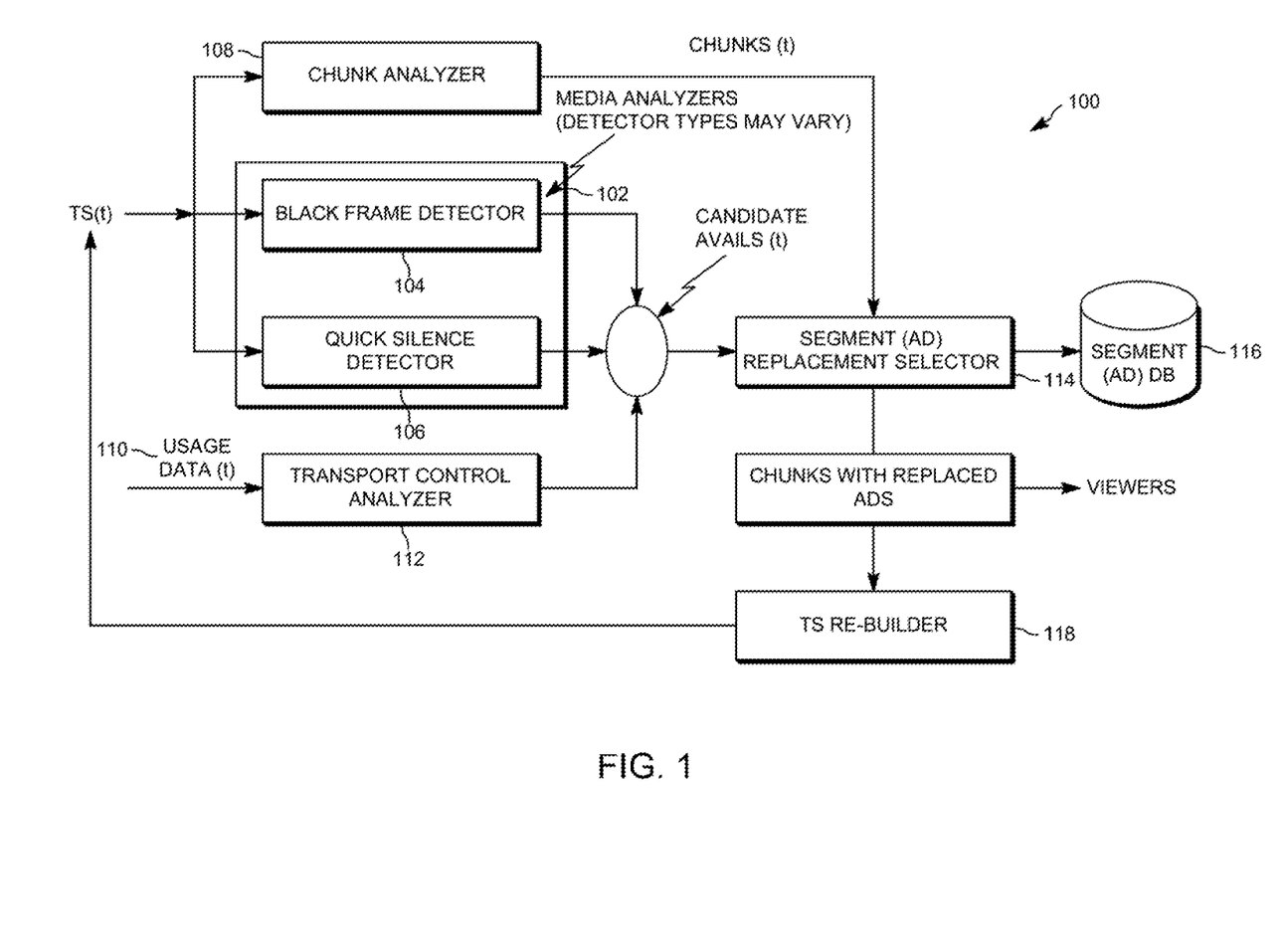
FIG. 1 is a schematic view of an advertisement replacement system in accordance to an embodiment.

By way of example, an embodiment illustrating an ad replacement system 100 is shown in FIG. 1, in which, at a time $t=t_0$, a transport stream (TS) of a video asset without SCTE-35 markers arrives for analysis. As an example, see the transport stream illustrated in FIG. 3 discussed below in greater detail.

The transport stream (TS) is passed through one or more Media Analyzers 102. For ad replacement, the media analyzers 102 may be a black frame detector 104 and a quick silence detector 106. In other embodiments, the media analyzers 102 can incorporate different or additional detectors, for instance, including video detectors (hard cuts, scene changes), text detectors (analysis of closed captions or subtitles), and audio detectors. Of course, other detectors may also be utilized. In an alternate embodiment, the system may be adapted to provide segmentation of a video asset, such as to extract sports highlights or the like. In this case, the detector operation may vary; for example, the media analyzers 102 may include a logo detector or a frame detector.

Simultaneously or sequentially with passing the transport stream through the media analyzers 102, the transport stream may also be passed through a Chunk Analyzer 108 for purposes of identifying encoding and chunking parameters of the transport stream (TS).

In addition, historic usage data 110 collected relative to previous viewings of the video asset by a population of actual viewers may be provided to a Transport Control Analyzer 112 to extract trick play information and build a statistical model of such usage with respect to the video asset (i.e., discrete points during the playback of the video asset corresponding to times when many viewers may have used fast forward, rewind, etc.).

The above three analyzers, i.e., the Media Analyzer 102, the Chunk Analyzer 108, and the Transport Control Analyzer 112, may pass their outputs to a Segment Replacement Selector 114 which compares and combines the information and determines candidate video segments for replacement from the source video asset based on available segments from an associated Segment Database 116.

In the specific case of ad replacement, the segments are advertisement availabilities. Here, the Segment Replacement Selector 114 chooses a set of replacement candidate segments based on available replacement lengths and encoding manifests and then grades each replacement candidate with a confidence score. Replacement candidate segments with a score higher than an operator-specified operational threshold are selected for insertion into the transport stream of the video asset and their encoding timing parameters are passed to the Chunker/TS Rebuilder 118. Encoding timing parameters include specific information about the point in the transport stream where the segmentation should occur. The timing information may be in the form of a frame number, or as a transport stream timestamp (referencing the transport stream program clock reference), or other similar indications of time. The Chunker/TS Rebuilder 118 then performs transcoding of the transport stream with the candidate segments suitably replaced using respective encoding timing parameters indicated by the Segment Replacement Selector 114.

The resulting transport stream may be streamed to clients and/or may also be fed back into the system 100 to repeat the above analysis at subsequent time intervals (i.e., daily or like interval). For example, as time increases from to at subsequent time intervals such as $t_2, t_3, \ldots t_n$, additional transport control information 110 should be available and the candidate segments (ad avails, in this specific embodiment) used by the Segment Replacement Selector 116 and used to build chunks may change, moving closer to the ideal frame to build the chunks.

Figure 2:
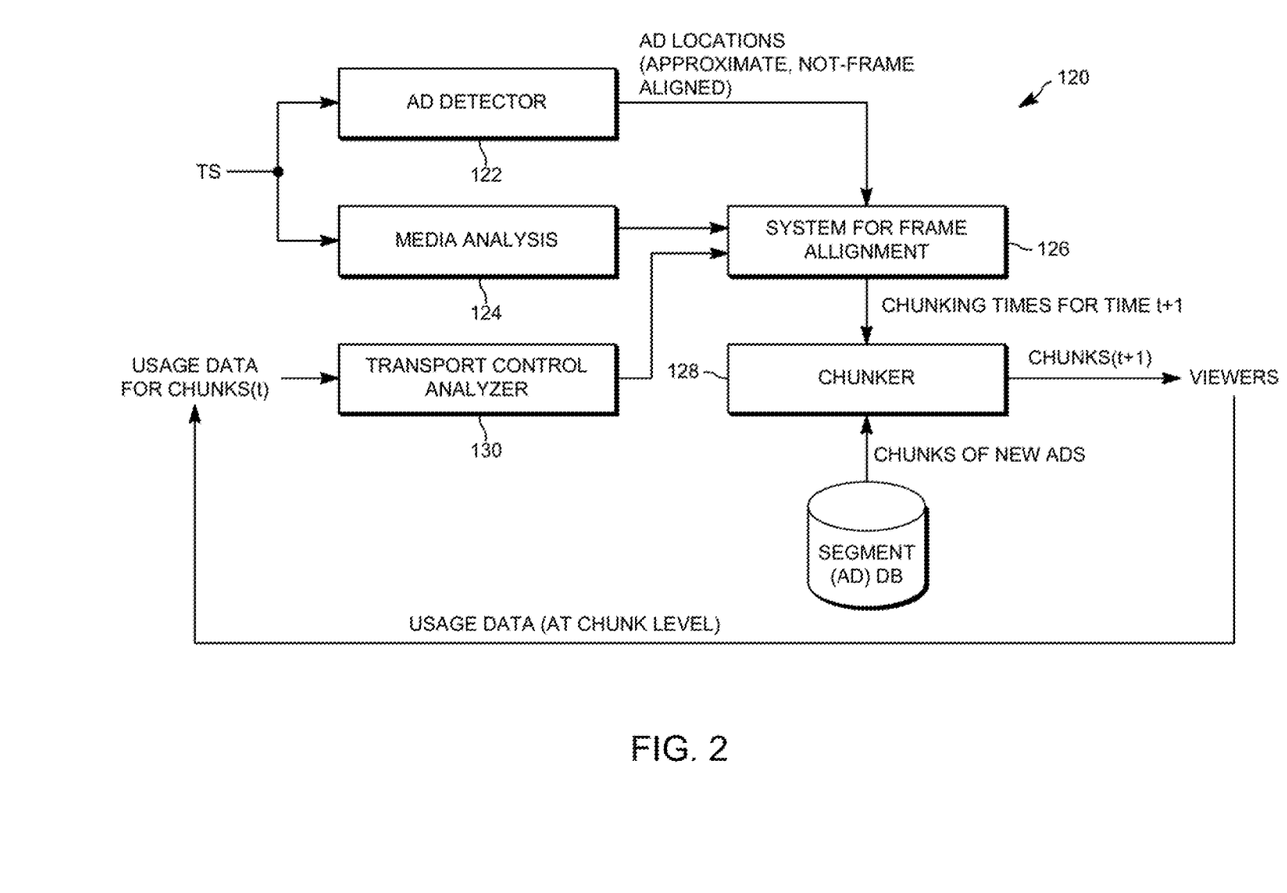
FIG. 2 is a schematic view of an advertisement replacement system in accordance to an alternate embodiment.

A further embodiment of an ad replacement system 120 is shown in FIG. 2. In contrast with the system 100 as shown in FIG. 1, transport control information in the system 120 is assumed unavailable during the initial operation of the procedure and may only become available at a later time. Thus, at an initial time (to), the transport stream (TS) of a video asset is analyzed by an Ad Detector 122, which provides approximate (not frame aligned) locations for ads. According to some embodiments, the Ad Detector 122 may identify the presence of a known or suspected advertisement in the transport stream (TS). The output of the Ad Detector 122 may not be precise, frame-aligned indications of the presence of the ad. According to some embodiments, the Ad Detector 122 may operate using so-called audio fingerprinting. In such a case, audio characteristics of small portions of the transport stream (TS) are extracted and compared to a database of known (or suspected) ads. When a match occurs, this indicates that the portion of the transport stream (TS) being examined is a part of an advertisement.

As the transport stream (TS) is analyzed, time points demarcating portions of the transport stream (TS) that are found to be ads are output from the Ad Detector 122. Optionally, the Ad Detector 122 may also output a confidence score, to indicate the level of likelihood that the portion of the transport stream (TS) contains an ad.

A Media Analysis component 124 may incorporate one or more of video detectors (black frame, hard cut, scene change, and similar), audio detectors (quick silence), and text detectors (extracting information from closed captioning). The Media Analysis component 124 may output relatively precise, frame-aligned points in time indicating where segmentation may occur in the video asset. For example, when the video contains a hard cut that is correlated in time with a short period of silence, this instance is output as a candidate segment point. Accordingly, the Media Analysis component 124 may output a large number of candidate segment points, many of which may not correspond to the beginning or end of an ad segment.

The System for Frame Alignment 126 uses the approximate ad segments (from the Ad Detector 122) and media analysis of the transport stream (TS) to produce chunks for viewers. According to some embodiments, the System for Frame Alignment 126 evaluates the portion of video between pairs of candidate segment points indicated by the Media Analysis component 124. For each such segment, the output of the Ad Detector 122 is evaluated in conjunction with parameters from the Media Analysis 124. In particular, the evaluation can choose any two candidate segment points Ta and Tb produced by the Media Analysis component 124. Any output of the Ad Detector 122 relating to the segment between Ta and Tb is considered. Using the fraction of the segment that was indicated as an ad by the Ad Detector 122 plus any confidence information output by the Ad Detector 122, a score is produced indicating the likelihood of the (Ta, Tb) segment to be an ad. The system continues to evaluate other pairs of segment points to determine likelihoods. After the segments have been evaluated, the system identifies certain segments as ads, based on the relative likelihoods, and, optionally, threshold values.

For segments identified as ads, the System for Frame Alignment 126 outputs the segment points (e.g., Ta, Tb) as chunking times. A Chunker 128 subsequently produces video chunks according to the output of the System for Frame Alignment 126. These may be streamed to client devices.

At a later time, transport control information collected from trick plays of users in the different chunks is provided to a Transport Control Analyzer 130 and the System For Frame Alignments 126 adjusts the exact frame location for the Chunker 128 to produce chunks. In particular, as the System 126 evaluates pairs of candidate segment points, the likelihood estimation is further affected by information of transport control events provided to the System for Frame Alignment 126 from the Transport Control Analyzer 128. For example, if several fast forward events occur within the segment being evaluated, the likelihood of the segment being an ad is increased.

The above referenced process continues iteratively and as more transport control information arrives. Accordingly, the chunking locations are further refined and become more closely aligned to frames that actually mark the start of ad segments.

Figure 3:
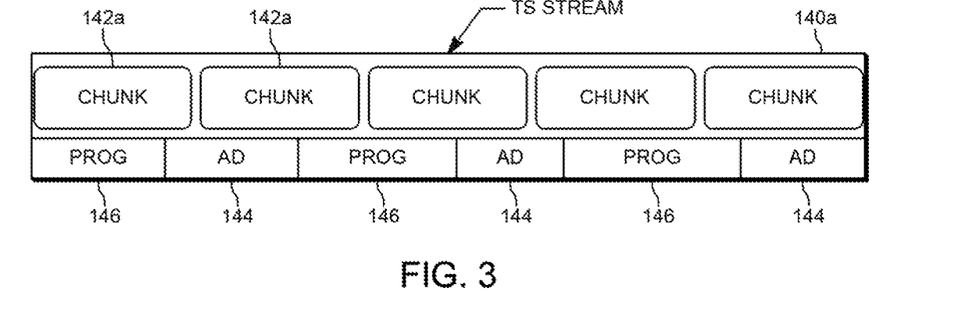
FIG. 3 is a diagram of a portion of a transport stream of a video asset at time to in accordance to an embodiment.

FIGS. 3-6 provide an exemplary embodiment illustrating ad replacement. FIG. 3 provides a portion of a transport stream 140a of a video asset as received at time $t_0$. The portion of the transport stream 140a is illustrated as including five separate sequentially-aligned chunks 142a which may be individually streamed to client devices. As shown in FIG. 3, the chunks 142a of the transport stream 140a are not aligned with the ad segments 144 and program segments 146 of the video asset. Thus, detection, removal, and insertion of desired segments are more difficult.

Figure 4:
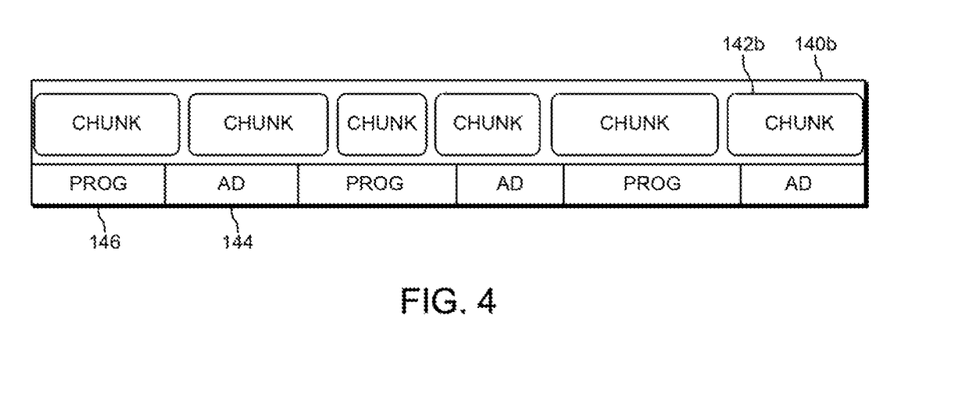
FIG. 4 is a diagram of the portion of the transport stream of the video asset of FIG. 3 at time $t_1$ in accordance to an embodiment.
Figure 5:
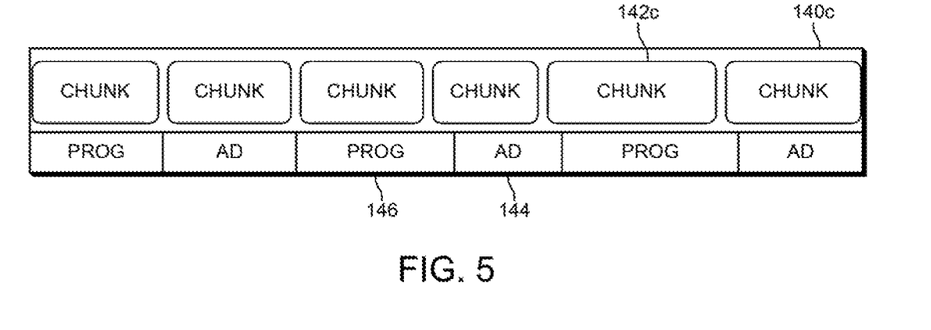
FIG. 5 is a diagram of the portion of the transport stream of the video asset of FIG. 3 at time $t_2$ in accordance to an embodiment.
Figure 6:
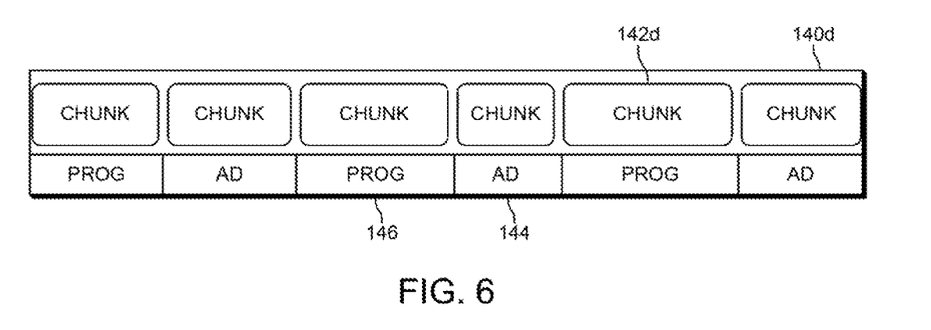
FIG. 6 is a diagram of the portion of the transport stream of the video asset of FIG. 3 at time $t_n$ in accordance to an embodiment.

As transport control information becomes available, for instance at time $t_1$, the systems 100 and 120 described above are able to improve alignment of boundaries of chunks 142b of the transport stream 140b relative to boundaries of ad segments 144 and program segments 146 of the video asset. As further transport control information becomes available, for instance at time $t_2$, the systems 100 and 120 described above are able to further improve alignment of boundaries of chunks 142c of the transport stream 140c relative to boundaries of ad segments 144 and program segments 146 of the video asset. Finally, after a sufficient amount of transport control information becomes available, for instance at time $t_n$, the systems 100 and 120 described above are able to substantially align the boundaries of chunks 142d of the transport stream 140d relative to boundaries of ad segments 144 and program segments 146 of the video asset. Thus, replacement of ads in the transport stream may be accomplished merely by inserting a replacement chunk or chunks in their entirety for an existing chunk or chunk in their entirety. Accordingly, chunks corresponding to program segments 146 need not be altered when replacing advertisements.

Figure 7:
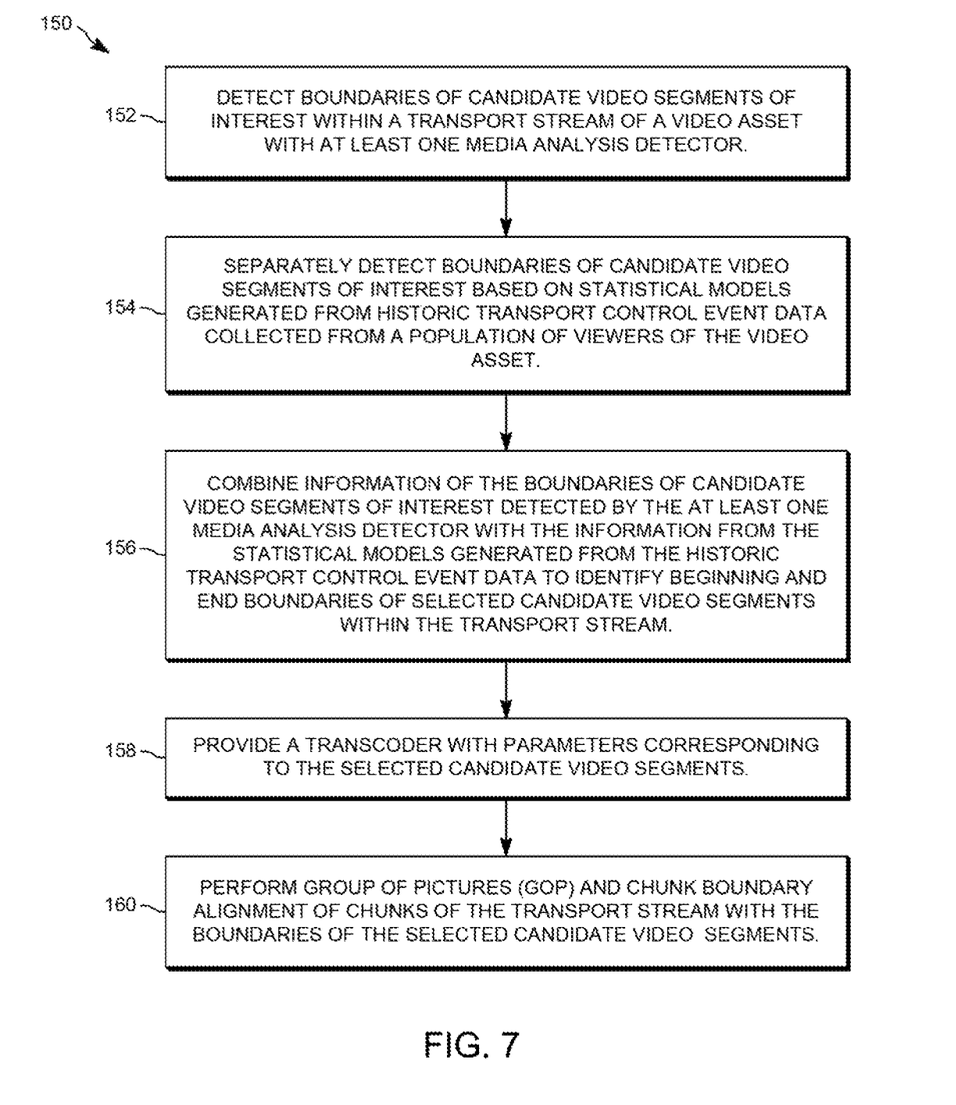
FIG. 7 is a flow diagram of a method of video segment detection and replacement in accordance to an embodiment.

A flow diagram of a method 150 of video segment detection within a transport stream of a video asset corresponding to the above embodiments is provided in FIG. 7. In step 152, boundaries of candidate video segments of interest within a video asset are detected with at least one media analysis detector, and in step 154, boundaries of candidate video segments of interest within the video asset are separately detected based on statistical models generated from historic transport control event data collected from a population of viewers of the video asset. In step 156, the information of the boundaries of candidate video segments of interest detected by the at least one media analysis detector is combined with the information of the boundaries of candidate video segments of interest from the statistical models generated from the historic transport control event data to identify beginning and end boundaries of selected candidate video segments within the transport stream. A transcoder is then provided with parameters of the boundaries corresponding to the selected candidate video segments in step 158 and group of pictures (GOP) and chunk boundary alignment of chunks of the transport stream is performed in step 160 with the boundaries of the selected candidate video segments. The candidate video segments of interest may be advertisements, sports highlights, news highlights, content summaries, or the like.

A system for carrying out any of the above disclosed methods may include software or the like provided on a circuit board or within another electronic device and can include various processors, microprocessors, modules, components, controllers, chips, disk drives, and the like. It will be apparent to one of ordinary skill in the art that systems, modules, components, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of video segment detection within a transport stream of a video asset, the transport stream being deliverable to client devices in a sequence of chunks, comprising the steps of:
   detecting boundaries of candidate video segments of interest within the transport stream, using at least one media analysis detector;
   separately detecting boundaries of candidate video segments of interest based on statistical models generated from historic transport control event data collected from a population of viewers of the video asset;
   combining information of the boundaries of candidate video segments of interest detected by the at least one media analysis detector with the information of the boundaries of candidate video segments of interest from the statistical models generated from the historic transport control event data to identify beginning and end boundaries of selected candidate video segments within the transport stream;
   providing a transcoder with parameters corresponding to the selected candidate video segments;
   refining the transport stream by performing group of pictures (GOP) and chunk boundary alignment of chunks of the transport stream with the boundaries of the selected candidate video segments; and
   iteratively using the refined transport stream to repeat the steps of detecting, separately detecting, combining, providing, and refining.

2. The method according to claim 1, further comprising the step of replacing at least one of the selected candidate video segments with a replacement video segment such that beginning and end points of the replacement video segment are aligned with beginning and end points of the selected candidate video segment being replaced.

3. A method according to claim 2, wherein the beginning and end points of the selected candidate video segment being replaced and the beginning and end points of the replacement video segment are aligned with chunk boundaries within the transport stream.

4. A method according to claim 1, wherein said detecting, separately detecting, combining, providing, and refining steps are repeated at pre-determined intervals of time to refine alignment of the boundaries of the chunks of the transport stream with the boundaries of the selected candidate video segments.

5. The method according to claim 1, wherein the at least one media analysis detector provides at least one of black frame detection, quick silence detection, hard cut detection, speech gender detection, speech structure detection, sentiment detection, topic detection, scene detection, sports highlight detection, and logo detection.

6. The method according to claim 1, wherein the statistical models generated from the historic transport control event data are provided by at least one transport control event analyzer that performs trick play detection including detection of at least one of fast-forward, rewind, play, skip, stop, next, back, pause, and replay, and that includes use of at least one of a machine learning tool and a statistical modeling tool.

7. The method according to claim 1, wherein an output of the at least one media analysis detector is converted into semantically-meaningful events within analyzed media of the video asset.

8. The method according to claim 7, wherein, during said combining step, an output of the at least one transport control event analyzer is combined with the semantically-meaningful events to identify the boundaries of the selected candidate video segments.

9. The method according to claim 1, further comprising the step of passing the transport stream through a chunk analyzer to provide information of bound chunks and manifests including descriptive metadata for the chunks of the transport stream of the video asset.

10. The method according to claim 1, further comprising the step of comparing the selected candidate video segments relative to replacement video content based on chunk metadata, transport control analysis, and media analysis.

11. The method according to claim 1, further comprising the step of transmitting operational encoding parameters to a video encoder to produce a transport stream of the video asset containing replacement video content.

12. The method according to claim 11, further comprising the step of feeding the transport stream of the video asset containing replacement video content into the at least one media analysis detector.

13. The method according to claim 1, wherein the candidate video segments of interest are video segments selected from the group of advertisements, sports highlights, news highlights, and content summaries.

14. A system of video segment detection within a transport stream of a video asset, the transport stream being deliverable to client devices in a sequence of chunks, said system comprising:
   at least one media analysis detector for detecting boundaries of candidate video segments of interest within the transport stream, using at least one media analysis detector;
   a transport control analyzer for separately detecting boundaries of candidate video segments of interest within the video asset based on statistical models generated from historic transport control event data collected from a population of viewers of the video asset;
   a segment selector for combining information of the boundaries of candidate video segments of interest detected by the at least one media analysis detector with information of the boundaries of candidate video segments of interest from the statistical models generated from the historic transport control event data and for identifying beginning and end boundaries of selected candidate video segments within the transport stream; and
   a transport stream rebuilder for refining the transport stream by performing group of pictures (GOP) and chunk boundary alignment of chunks of the transport stream with the boundaries of the selected candidate video segments;
   wherein the system is configured to iteratively:
      provide the refined transport stream for use by the at least one media detector for detecting, and for use by the transport control analyzer for separately detecting,
      provide information from the detecting and the separately detecting to the segment selector for repeated combining, and
      provide identified boundaries from the repeated combining to the transport stream rebuilder for repeated refining.

15. The system according to claim 14, wherein the transport stream rebuilder includes a video encoder for producing a transport stream of the video asset in which beginning and end points of the selected candidate video segments are aligned with chunk boundaries within the transport stream produced by the video encoder.

16. The system according to claim 14, wherein the transport stream rebuilder includes a video encoder for producing a transport stream of the video asset in which at least one of the selected candidate video segments is replaced with a replacement video segment and in which beginning and end points of the replacement video segment is aligned with chunk boundaries within the transport stream produced by the video encoder.

17. The system according to claim 14, wherein the at least one media analysis detector includes at least one of a black frame detector, a quick silence detector, a hard cut detector, a speech gender detector, a speech structure detector, a sentiment detector, a topic detector, a scene detector, a sports highlight detector, and a logo detector.

18. The system according to claim 14, wherein the transport control analyzer includes at least one of a machine learning tool and a statistical modeling tool and performs trick play detection including detection of at least one of fast-forward, rewind, play, skip, stop, next, back, pause, and replay.

19. The system according to claim 14, further comprising a chunk analyzer for providing information of bound chunks and manifests including descriptive metadata for the chunks of the transport stream of the video asset to the segment replacement selector.

20. A non-transitory computer-readable storage medium comprising stored instructions which, when executed by one or more computer processors, cause the one or more computer processors to perform steps of:
   detecting boundaries of candidate video segments of interest within a transport stream of a video asset, using at least one media analysis detector;
   separately detecting boundaries of candidate video segments of interest within the video asset based on statistical models generated from historic transport control event data collected from a population of viewers of the video asset;

combining information of the boundaries of the candidate video segments of interest detected by the at least one media analysis detector with the information of the boundaries of the candidate video segments of interest from the statistical models generated from the historic transport control event data to identify beginning and end boundaries of selected candidate video segments within the transport stream;

providing a transcoder with parameters corresponding to the selected candidate video segments;

refining the transport stream by performing group of pictures (GOP) and chunk boundary alignment of chunks of the transport stream with the boundaries of the selected candidate video segments; and iteratively using the refined transport stream to repeat the steps of detecting, separately detecting, combining, providing, and refining.

* * * * *